Patented Feb. 24, 1953

2,629,703

UNITED STATES PATENT OFFICE 2,629,703

RESINOUS COMPOSITION COMPRISING PHENOL-ALDEHYDE AND KETONE-ALDEHYDE CONDENSATION PRODUCTS

George Karl Vogelsang, La Mott, Pa., assignor to The Borden Company, New York, N. Y., a corporation of New Jersey No Drawing. Application June 2, 1948,
Serial No. 30,733

16 Claims. (Cl. 260—43)

The present invention relates to a new and novel class of potentially reactive compositions possessing resinoid characteristics. The preparation of the potentially reactive compositions of the present invention is simplicity itself, entailing as it does nothing more than physically mixing together selected ketone-aldehyde and potentially reactive phenol-aldehyde condensation products.

The object of the present invention is to provide a new class of potentially reactive compositions which is convertible to the infusible, insoluble and thermo-rigid resinous state.

The complex chemistry of the component condensation products utilized in the pursuit of the present invention is currently too imperfectly understood to permit of assigning characteristic structural formulas to these materials. Consequently, in defining these condensation products it is necessary to characterize them in terms of their derivation and in terms of their known inherent physical and chemical attributes. In this manner it is feasible to distinguishably differentiate the usable condensation products from all other types.

Of the almost infinite variety of condensation products that may be prepared by reacting a ketone with an aldehyde only a handful is suitable for use in the present invention. Only methyl ketones are suitable for the preparation of the requisite condensation products. Further, as the number of carbon atoms in the methyl ketone increases its reactivity with aldehydes diminishes and the resultant condensation products become less and less suitable for the purposes of the present invention. When the radical combined to the methyl ketone complex contains more than four carbon atoms it does not appear to be feasible to produce suitable condensation products. To be suitable the ketone-aldehyde condensation product must be derived from a methyl ketone having the general formula $$CH_3-CO-R'$$

wherein R' represents an aliphatic radical having from one to four carbon atoms.

Only aliphatic aldehydes containing five or fewer carbon atoms lend themselves toward the production of suitable ketone-aldehyde condensation products. Accordingly, the only ketone-aldehyde condensation products suitable for use in the present invention are those derived from aldehydes having the general formula R"—CHO, wherein R" represents a member selected from the group consisting of hydrogen and aliphatic radicals having from one to four carbon atoms.

Not all condensation products derived from the reaction between the afore-defined ketones and aldehydes are suitable for use in the present invention. To be suitable the ketone-aldehyde condensation products must simultaneously be fusible, soluble, substantially non-resinous, substantially non-volatile, and reactive.

By the term "soluble" I mean that the condensation products must be soluble in one or more of the following compounds or mixtures thereof: water, aqueous acid solution, aqueous alkaline solution, methanol, ethanol, butanol, acetone, ethyl methyl ketone, methyl isobutyl ketone, methyl acetate, ethyl acetate, butyl acetate, dioxane, formamide, acetamide, methyl ether of ethylene glycol, ethylene glycol, ethyl hexane diol, concentrated formic acid, glacial acetic acid, furfural, tetra hydro furfural, tetra hydro furfuryl alcohol, phenol, cresol, 37% aqueous formaldehyde, ethylene chlorhydrin, propylene chlorhydrin, ethyl amine, ethylene diamine, monoethanolamine, diethanolamine, amino ethyl ethanol amine, morpholine, thiodiglycol, etc.

While on the subject of "solubility" I would like to point out that the phenol-aldehyde condensation products to be described later, as well as the potentially reactive compositions of the present invention (prior to cure) are also "soluble" in the sense that they will dissolve in one or more of the above compounds or mixtures thereof.

To be suitable for use in the present invention the ketone-aldehyde condensation products must be non-resinous. In this connection it should be pointed out that many ketone-aldehyde condensation products are "resinous" in appearance only and that when subjected to rigorous analysis the products can be shown to be non-resinous by (1) a determination of their low molecular weight (products of low molecular weight are non-resinous); (2) through a showing that the compound, after the necessary purification, even though substantially "non-volatile," can be distilled under appropriate conditions (in general, resins cannot be distilled without decomposition), or (3) that the material, as such or in the form of a simple derivative, can be crystallized (resins, as such, or their simple derivative, cannot be crystallized in the ordinary sense). Most ketone-aldehyde condensation products are possessed of a complex composition, comprising a variety of related materials. In some instances there may be a very small quantity of resinous by-product material whose presence, in view of the small quantity in which it may be present, is not unduly objectionable. If a substantial quantity of resinous material be present it cannot be used in the present process. The ketone-aldehyde condensation products suitable for use in the present invention, after appropriate purification, can be shown to be non-resinous, possessed of a low molecular weight and, either as such or in the form of their simple derivatives, can be distilled and crystallized. (Inasmuch as many ketone-aldehyde condensation products are quite heat sensitive it is frequently desirable to convert the products into the form of their relatively stable simple derivatives which permits of ready purification and isolation. Often the ketone-aldehyde condensation product can readily be acylated to yield an ester which can be distilled in appropriate high vacuum distillation equipment and subsequently recovered in crystalline form.) The usable ketone-aldehyde condensation products may be defined as being "substantially non-resinous." By restricting the ketone-aldehyde condensation products to the "substantially non-resinous" type there are ruled out the "resinous" condensation products which are either inoperative in the present process or lead to reaction products which are radically different in kind.

The ketone-aldehyde condensation products suitable for use in the present invention are, per se, not appreciably volatile and, owing to their heat-sensitive nature, cannot, in general, be distilled in ordinary equipment at atmospheric pressure without decomposition. The substantially non-volatile products may, however, be distilled unchanged via the use of special high vacuum equipment (e. g., as in a molecular still). In other instances, the substantially non-volatile products may first be acylated and the resultant esters may then be distilled at elevated temperatures in appropriate equipment. In this connection it is emphasized that the fact that the usable ketone-aldehyde condensation products are "substantially non-volatile" should not be taken to mean that they are "non-distillable." By way of example, the well known plasticizer, tricresylphosphate, is "substantially non-volatile" yet, under appropriate conditions, it may be distilled. To all intents and purposes the ketone-aldehyde condensation products suitable for use may be referred to as being "substantially non-volatile." This restriction to the use of the ketone-aldehyde condensation products which are "substantially non-volatile" serves to exclude the readily volatile condensation products (such as 3-keto-butanol), which substances are either inoperative in the present process or lead to end products that are radically different in kind.

To be suitable for use in the present invention the ketone-aldehyde condensation product must be "reactive" in the sense that it can engage in a variety of chemical reactions and, in a more specific sense, that it be possessed of the specialized type of reactivity described below. Very many ketone-aldehyde condensation products contain one or more alcoholic hydroxyl groups which usually permit of esterification. The reactivity associated with the alcoholic hydroxyl groups is not the controlling criteria insofar as the present invention is concerned. The specialized type of reactivity that the condensation products must possess in order that they can function properly in the present invention is due to the presence of a peculiar functionally reactive atomic grouping of unknown structure which permits these compounds to undergo very ready condensation in the presence of a strong alkali. When a strong alkali, such as sodium hydroxide solution, is added to a ketone-aldehyde condensation product of the type under discussion, the same will, either immediately or upon heating, undergo ready condensation, usually leading to the formation of high molecular weight complexes or materials of the "C" stage resinous type (which latter are insoluble, infusible and substantially thermo-rigid). This unique type of reactivity is most manifest in the ketone-aldehyde condensation products wherein the ketone is acetone or the aldehyde is formaldehyde. The maximum reactivity is displayed by appropriate acetone-formaldehyde condensation products. Only compounds derived from the methyl ketones are possessed of this attribute to an appreciable extent. Furthermore, it has been noted that in methyl ketones possessing the general formula $CH_3-CO-R'$, the $R'$ should be an aliphatic radical containing not more than four carbon atoms. This restriction to the use of ketone-aldehyde condensation products possessed of the above defined reactivity eliminates many condensation products which are inoperative in the present invention (products such as dimethylol tetrahydro-4-pyrone and the heptahydric alcohol resulting from the condensation of one mole of acetone with 6 moles of formaldehyde, etc.).

To be suitable for use in the present invention the ketone-aldehyde condensation product must be "fusible." By restricting the condensation products to the fusible type there are ruled out the many infusible ketone-aldehyde condensation products which are either inoperative in the present process or lead to formation of end products that are radically different in kind.

Unsaturation in the aldehyde or the ketone employed in the making of the ketone-aldehyde condensation products does not appear to materially affect the characteristics associated with the potentially reactive products of the present invention.

As regards the physical state of the usable ketone-aldehyde condensation products it has been found that materials in the fluid, semi-fluid or the solid state are equally effective. For reasons of convenience, however, it is desirable to utilize the liquid condensation products or, alternatively, in the instance of the solid or near solid condensation products it is preferable to first thin them down with an appropriate solvent so as to procure a readily pourable liquid. Fluid products are desirable because of the ease with which they may be blended together with the phenol-aldehyde condensation products to yield the unique, distinctive and wholly unexpected compositions of the present invention.

Upon the basis of the above factual data the ketone-aldehyde condensation products suitable for use in the present invention may be defined in terms of their derivation and chemical and physical properties as follows:

"Ketone-aldehyde condensation products selected from the class consisting of the fusible, soluble, substantially non-resinous, susbtantially non-volatile and reactive condensation products produced by reacting together a ketone having the general formula $CH_3-CO-R'$, wherein $R'$ represents an aliphatic radical having from one to four carbon atoms, and an aldehyde having the general formula $R''-CHO$, wherein $R''$ represents a member selected from the group consisting of hydrogen and aliphatic radicals having from one to four carbon atoms."

All ketone-aldehyde condensation products that fall within the framework of the above definition may be used in accordance with the present invention to yield the new, novel and unexpected potentially reactive compositions of the present invention. All ketone-aldehyde condensation products that fall outside of the framework of the above definition are unsuited for use in the present invention either because they are inoperative or because they lead to the production of products radically different in kind from those of the present invention.

Ketone-aldehyde condensation products suitable for use in the present invention are best prepared by reacting a ketone with an aldehyde (both as above defined) in the presence of an appropriate catalyst. It is not my intention to here set forth any detailed procedure as to the method of making ketone-aldehyde condensation products of the type indicated as suitable for use in the instance of the present invention, inasmuch as the technical and patent literature abounds in detailed descriptions as to their preparation. In the interest of specificness, however, I refer to U. S. Patent No. 2,191,802 as setting forth the preparation of ketone-aldehyde condensation products preeminently suited for use in the present invention. Of the various condensation products therein described the material referred to as "standard AFR" is ideally suited for use in the present invention. In connection with the "standard AFR" it is interesting to note that in spite of its "resinous" appearance it has been found that this product is essentially non-resinous in character, is possessed of a low molecular weight, can be distilled in a molecular still and can readily be acetylated to an acetate which is readily distillable and crystallizable. It is to be distinctly understood, however, that we are not limited to the use of ketone-aldehyde condensation products produced in accordance with said patent, but can utilize any and all condensation products that fall within the framework of the above defined limitations.

I have thus far discussed the nature of only the ketone-aldehyde condensation products suitable for use in the pursuit of the present invention. Of equal importance is the nature of the phenol-aldehyde condensation products that are used in conjunction with the above-identified ketone-aldehyde condensation products to produce the potentially reactive compositions of the present invention which possess novel and unexpected attributes.

For purposes of study and utility it is customary to divide phenol-aldehyde condensation products into two categories, one comprising the phenol-aldehyde condensation products usually referred to as "resins of the permanently fusible" or "Novolak" type. For reasons of convenience I shall hereafter refer to resins of this class as "novolaks." Characteristic of novolaks is the fact that upon prolonged standing at ordinary temperature or under the influence of reasonable heat they will not become converted to the infusible, insoluble and thermo-rigid state. Novolaks are usually prepared by reacting a phenol with an aldehyde in the proportion of one mole of phenol to one or slightly less than one mole of aldehyde, generally in the presence of a catalyst.

The nature of the catalyst employed in preparing a novolak depends upon the type of phenol and aldehyde under consideration. Thus, in the instance of phenol and formaldehyde it is customary to employ an acid catalyst for novolak formation while in the instance of phenol and furfural it is customary to employ an alkaline base such as potassium carbonate.

Novolaks cannot of themselves be converted to the infusible, insoluble and thermo-rigid state. However, through the agency of appropriate cross-linking agents, commonly referred to as curing or hardening agents, as typified by material containing reactive methylene groups (e. g., hexamethylenetetramine) it is possible to procure potentially reactive compositions which, when subjected to a proper time-temperature schedule, are convertible to the infusible, insoluble and thermo-rigid so-called "C" state.

Phenol-aldehyde condensation products of the novolak class are essentially unsuited for use in the pursuit of the present invention. Novolak resins are not possessed of the necessary functional attributes that are directly concerned in the production of the potentially reactive compositions of the present invention.

Phenol-aldehyde condensation products of the non-novolak type are commonly referred to as being of the "potentially reactive type" and, for reasons of convenience, resins of this class will hereinafter be thusly referred to. The chief attribute of phenol-aldehyde condensation products of the potentially reactive type is the fact that upon long standing at ordinary temperatures, or rapidly under the influence of heat, they will undergo reaction and become converted to the infusible, insoluble and thermo-rigid state (the so-called "C" stage). It is to be observed that resins of the potentially reactive type, in contra-distinction to resins of the novolak type, are convertible to the "C" stage by merely heating them, without the necessity of having to add a co-reactant or cross-linking agent. Potentially reactive resins are frequently referred to as "single stage resins."

Potentially reactive phenolic resins are prepared by reacting a phenol with a quantity of aldehyde which, if the reaction be carried to completion, is capable of yielding the ultimate infusible, insoluble and thermo-rigid form of resin. This generally calls for a quantity of aldehyde that is in substantial molar excess of the quantity of phenol employed. The type of catalyst used depends upon the nature of the reactants employed. In the instance of phenol and formaldehyde it is customary to utilize an alkaline catalyst, e. g., sodium hydroxide.

Only phenol-aldehyde condensation products of the potentially reactive type are suitable for use in the pursuit of the present invention. All other types of phenol-aldehyde condensation products are essentially unsuited.

The precise physical and chemical properties of a potentially reactive phenol-aldehyde condensation product depend upon the nature of the phenol, aldehyde and the catalyst employed, as well as upon whether or not a diluent is used in carrying out the reaction. It is also influenced by the time-temperature schedule employed. The preferred phenols for the production of potentially reactive phenol-aldehyde condensation products suitable for use in the present invention, are phenol, meta substituted phenols (such as meta-cresol), 3-5 substituted phenols (e. g., 1-3-5-xylenol), resorcinol and phoroglucinol. Although any one of several aldehydes may be utilized for the production of potentially reactive resins suitable for use in the pursuit of the present invention, I believe that formaldehyde and, in some instances, glyoxyl are the preferred aldehydes. Paraformaldehyde may be used in lieu of formaldehyde.

Purified non-resinous phenol-aldehyde condensation products such as phenol di- and tri-alcohol are preeminently suited for use in the present invention.

While I have cited the preferred igredients to be used in the production of the potentially reactive phenol-aldehyde condensation products suitable for use in the present invention, I wish it to be distinctly understood that I am not limited to the use of condensation products produced out of the "preferred" ingredients, but can utilize any and all phenol-aldehyde condensation products of the potentially reactive type.

It is not my intention to here set forth any detailed procedure as to the method of making potentially reactive phenol-aldehyde condensation products inasmuch as the technical and patent literature abound in detailed description as to their preparation.

Potentially reactive phenol-aldehyde condensation products may be produced in either the solid or liquid state. The liquid compositions usually owe their fluidity to the presence of a fluid material or solvent (e. g., water, free phenol, alkaline aqueous solutions, alcohol, acetone, isopropanol, methanol, or aqueous solutions of the aforementioned alcohols). For the purposes of the present invention the potentially reactive phenol-aldehyde condensation product may be in either the liquid or solid state. For reasons of convenience it is desirable to utilize the condensation product in the form of a solution or as a liquid resin.

To aid in the understanding of the present invention and in the interests of elucidating the mechanics of the reactions involved the following factual data is presented:

In U. S. Patent 2,191,802 it has been disclosed that ketone-aldehyde condensation products are capable of entering into reaction with a wide variety of materials. It is shown that when ketone-aldehyde condensation products are reacted with phenols and amines resinous entities come into being. It has also been indicated that appropriate ketone-aldehyde condensation products, particularly of the type referred to as "super reactive AFR" (see above identified patent) are capable of functioning as cross-linking or hardening agents for phenol-aldehyde resins of the novolak type. In this manner appropriate ketone-aldehyde condensation products can replace such common hardening agents (as hexamethylenetetramine) for phenol-furfural and phenol-formaldehyde novolaks.

That novolaks require the use of a cross-linking agent of one type or another to permit of their being thermoset to the infusible and insoluble state is a well recognized fact. That ketone-aldehyde condensation products such as AFR are capable of functioning in the capacity of hardening agents is a fact that could not have been foretold, but finding it to be a fact the reaction is looked upon as being understandable and factual.

On the other hand it is a recognized fact that potentially reactive phenol-aldehyde condensation products are readily thermosettable without the necessity of including a hardening agent. When a hardening agent is deliberately incorporated into a potentially reactive composition the same exerts no appreciable effect upon the ultimate cure and not infrequently slows up the cure or functions as a substantially inert material.

The wholly unexpected discovery has now been made that appropriate ketone-aldehyde condensation products are capable of entering into reaction with potentially reactive phenol-aldehyde condensation products to yield infusible and insoluble thermoset compositions possessed of new and unusual properties. The infusible and insoluble thermoset compositions thus procured are not primarily physical mixtures of two types of infusible and insoluble thermoset resinous entities, but rather they contain a substantial quantity of a new type of resinous entity whose molecule contains within itself the original components that entered into the composition. In some respects the cured products may be looked upon as resinous alloys. When it is considered that potentially reactive phenol-aldehyde resins contain within themselves all the necessary functional attributes required by the mechanics of the reaction involved in their curing it might be supposed that the addition of a material such as a ketone-aldehyde condensation product would have no direct bearing upon the reaction or at the most would behave as a diluent. This does not appear to be the case inasmuch as the potentialities of the products of the present invention differ radically from those that one might, in an additive sense, anticipate from combinations of phenol-aldehyde and ketone-aldehyde condensation products.

The above alluded to wholly unexpected reaction is illustrated by the fact that when one starts with a fixed quantity of an appropriate ketone-aldehyde condensation product containing a finite amount of alkaline catalyst (e. g., "standard AFR" of U. S. Patent 2,191,802 catalyzed with 4/normal sodium hydroxide solution) and adds thereto a potentially reactive phenol-formaldehyde condensation product, the effect upon the rate of cure is clearly indicative of a reaction between the two types of condensation products. In a series of experiments the rate of cure of the potentially reactive phenol-aldehyde condensation product taken alone was approximately equal to the rate of cure of the catalyzed standard AFR taken alone. When the quantity of potentially reactive phenol-formaldehyde resin content of the mixture of the two substances equaled 5% it was found that the speed of cure of the resultant mixture was about 20% faster than the speed of cure of either condensation product per se. As the percentage of potentially reactive phenol-formaldehyde condensation product was increased the rate of cure became ever faster and faster and, in the instance of the above example, reached its maximum when the potentially reactive phenol-formaldehyde condensation product was present to the extent of between 25 and 30% on the weight of the whole compositon. As the percentage of potentially reactive phenol-formaldehyde resin was further increased the speed of cure started tapering off and when the concentration of potentially reactive phenol-formaldehyde condensation product became approximately 75% the speed of cure had dropped to a parity with that of the original condensation product per se. When the ratio of potentially reactive phenol-formaldehyde resin to that of the catalyzed standard AFR was adjusted to yield the maximum speed of cure the potentially reactive combination cured in approximately one-third the time required for either material to cure alone—the speed of cure was three times as fast. This wholly unexpected result as regards the speed of cure is but one of several manifestations which, taken together, prove beyond a shadow of a doubt that the mechanics of the reaction involved in the curing of the potentially reactive combinations of the present invention are unique and distinct from any curing mechanism predicated upon the simultaneous but independent curing of the potentially reactive entities entering into the composition.

Another of the unexpected manifestations relates to the strength of the resultant cured product. Potentially reactive phenol-aldehyde condensation products, particularly those based upon phenol and formaldehyde, are known to yield ultimate infusible and insoluble thermo-rigid cured products of great strength. On the other hand, the infusible and insoluble thermo-rigid cured products obtainable from appropriately catalyzed ketone-aldehyde condensation products are substantially weaker in strength and less resistant to the action of hot water. It has been found that the infusible and insoluble thermo-rigid cured compositions derived from the potentially reactive combinations of the present invention are possessed of a mechanical strength and a chemical resistance that is on a substantial parity with that of the best phenol-aldehyde condensation products even though the concentration of the potentially reactive phenol-aldehyde condensation product may be the minor component of the whole, e. g., between 10 and 30% of the whole. It has been found that in the instance of certain fillers, such as asbestos, one can, under optimum conditions of cure, procure ultimate cured articles that are substantially stronger than the best articles procured with the same fillers using phenol-formaldehyde resins.

When the potentially reactive combinations of the present invention are cured in thin sections or films the resultant cured product appears transparent and optically homogeneous. It is a well known fact that potentially reactive phenol-aldehyde condensation products (after cure) have but a very limited tolerance for, and more generally, are incompatible with materials alien to themselves. Ordinarily, upon curing, the resultant compositions become opaque or give other evidence of a polyphase or heterogeneous system. The fact that homogeneous products result in the curing of the reactive combinations of the present invention may be taken as an indication that the cured product is dominated by a unitary reaction product, which, under the circumstances, can only result from an interreaction between the phenol-aldehyde and the ketone-aldehyde condensation products.

The change in the speed of cure as the ratio of the ingredients is altered, the greatly increased speed of cure as compared to that of the individual components, the greatly increased strength and chemical resistance as contrasted against that of the theoretical mean for the blend, are all facts which support the conclusion that during the curing of the potentially reactive combinations of the present invention the phenol-aldehyde and the ketone-aldehyde condensation products react with one another. As further evidence it has been found that the index of refraction of the cured products of the present invention, particularly in the instance of the optimum proportioned type (maximum speed of cure type) is appreciably different from the refractive index as calculated from the percentage composition.

Upon the basis of our present knowledge the cured products derived from the potentially reactive combinations of the present invention consist of three distinct types of entities which, is most instances, are mutually compatible with another. One portion of the ultimate cured article consists of cured phenol-aldehyde resinous condensate. Another portion appears to consist of cured ketone-aldehyde condensation product. The remaining and larger portion of the whole appears to consist of a cured product resulting from the reaction between potentially reactive phenol-aldehyde and ketone-aldehyde condensation products. It is believed that it is this portion of the product which is primarily responsible for the unexpected and unanticipated attributes that manifest themselves.

In summarizing the above findings I might enumerate the unique and distinctive attributes characteristic of the potentially reactive combinations of the present invention and their ultimate cured products. The reactive combinations of the present invention cure at a decidedly faster rate than that of the components taken individually. The physical strength and chemical resistance of the cured products is unexpectedly high as compared with what might be anticipated upon the basis of their percentage composition. The cured products are unusually uniform and homogeneous, giving but little evidence of separation into separate phases. On the whole, the cured materials derived from the compositions of the present invention are possessed of the mechanical strength and chemical resistance characteristic of straight phenol-formaldehyde resins while retaining to an unexpectedly large degree the novel and unique attributes associated with cured ketone-aldehyde condensation products. The specialized utility of the products of the present invention is largely derived from this circumstance.

Results paralleling the above have been procured with a wide variety of ketone-aldehyde and phenol-aldehyde condensation products. The usable ketone-aldehyde condensation products are essentially those that have already been defined. Similarly, the phenol-aldehyde condensation products suitable for use in the pursuit of the present invention are all those that fall within the framework of the definition given above. It has been observed that the fastest curing, strongest and hardest compositions result when fusible and soluble reactive ketone-aldehyde condensation products of the type of "standard AFR" and the potentially reactive phenol-aldehyde resins derived from phenol and formaldehyde are employed in combination. The inclusion of moderate quantities of "modifying agents" is frequently desirable.

Attention is directed to the important fact that the potentially reactive compositions of the present invention, prior to cure, are nothing more or less than physical solutions—no measurable chemical reaction occurs between the condensation products prior to cure. This aspect is specifically emphasized so as not to confuse the potentially reactive compositions of the present invention with those of another of my inventions whereby greatly improved products are produced through chemical interaction between the condensation products, as is set forth in application Serial No. 40,165, filed July 22, 1948, and entitled "Potentially Reactive Resinous Compositions Possessing Resinoid Characteristics."

Having now described and defined the nature of the condensation products that enter into the production of the potentially reactive compositions of the present invention I will now describe the manner in which these products are produced. The processing equipment and the manipulative technique employed is extremely simple and does not depend upon the use of highly specialized equipment or engineering skill beyond the ordinary. It is only necessary to bring the two reactants into intimate contact with one another so that a homogeneous mixture results. As already indicated, in its preferred embodiment, the potentially reactive compositions are in the form of chemical solutions rather than in the form of mechanical dispersions.

For reasons of practicality the examples presented are confined to the use of the preferred types of condensation products. It should be understood, however, that other less preferable condensation products, as long as they fall within the framework of the critically limiting factors that have been cited, may be employed, though not as advantageously.

Example 1

One hundred parts by weight of an acetone-formaldehyde condensation product ("standard AFR," U. S. Patent 2,191,802) are stirred with 25 parts by weight of a potentially reactive liquid phenol-formaldehyde condensation product (65% solids) until a uniform solution results. This solution, without further processing, constitutes a potentially reactive composition of the present invention. Prior to use an alkaline catalyst is stirred in (e. g., 48 mil of a 4/normal solution of sodium hydroxide per pound of the potentially reactive composition). The resultant catalyzed product is suitable for the impregnation of paper, textiles, glass cloth, etc.; it is suitable as an adhesive for the production of laminated goods out of paper, plywood, etc., or as an adhesive between dissimilar products; it is useful as a bonding agent for the production of cold molded articles, including the manufacturing of friction elements.

Example 2

One hundred parts by weight of an acetone-formaldehyde condensation product ("standard AFR," U. S. Patent 2,191,802) are stirred with 30 parts of weight of a phenol-meta-cresol-formaldehyde condensation product (55% solids) until a uniform solution results. (The phenolic condensate was prepared by reacting a mixture comprising one mole of phenol, one mole meta-cresol, and three moles of formaldehyde (37+½% aqueous solution) along with a small amount of sodium hydroxide as catalyst. The condensation product was then concentrated to a solids content of approximately 65%.)

Example 3

One hundred parts by weight of an acetone-formaldehyde condensation product (prepared not after the manner set forth in U. S. Patent 2,191,802, but by condensing acetone with an excess of formaldehyde in the presence of potassium carbonate as catalyst and then concentrating by evaporating off the ready volatiles) are mixed with 30 parts by weight of a potentially reactive resorcinol-formaldehyde condensation product (prepared by reacting one mole of resorcinol with about ⅔ mole of formaldehyde in the presence of some alcohol, and then, after cooling to room temperature, adding enough free formaldehyde so as to render the same potentially reactive while yet possessed of a reasonable working life). The resultant potentially reactive solution was possessed of a moderate shelf life and, with an addition of an alkaline catalyst (4/normal sodium hydroxide solution) it could be quickly cured up at a temperature of about 212° F.

Example 4

One hundred parts by weight of an ethyl-methyl ketone-formaldehyde condensation product (prepared after the manner outlined in U. S. Patent 2,191,802) was mixed with 30 parts by weight of a potentially reactive phenol-formaldehyde condensation product (prepared by reacting one mole of phenol with 1¾ moles of aqueous formaldehyde, using sodium hydroxide as the catalyst). The resultant potentially reactive combination could readily be cured upon heating (using a catalyst such as 4/normal sodium hydroxide). The ultimate cured product was not quite as strong as in the instance of the product of Example 1. The product possessed an enhanced solubility in organic solvents.

The potentially reactive compositions of the present invention may be thinned down via the use of appropriate solvents. The potentially reactive compositions are "soluble" in the sense that they will dissolve in one or more or in combinations of the compounds that we have already enumerated in connection with the solubility of the ketone-aldehyde condensation products usable in the production of the products of the present invention. In instances where water alone cannot be employed it has been found that aqueous solutions of either acetone, methanol, ethanol or isopropanol or mixtures thereof give excellent results. Where a less readily volatile solvent is required ethylene glycol has proven very satisfactory.

At the time of use there is added to the potentially reactive compositions of the present invention an alkaline catalyst of the type indicated below. The amount and type of catalyst employed depends upon the nature of the application. For purposes of convenience we have come to look upon an aqueous 4/normal sodium hydroxide solution as the "standard catalyst." One may at the time of the addition of the catalyst, or along in with the catalyst, include a material calculated to augment the water resistance of the ultimate cured compositions.

The potentially reactive compositions of the present invention are rendered readily curable upon the incorporation of a catalyst. All strongly alkaline materials function in the role of catalyst. The stronger the alkaline material, the more potent its catalytic properties. The greater the quantity of catalyst that is added, the faster the cure. The alkaline catalysts may belong to anyone of several classes. The hydroxides of cesium, rubidium, potassium, sodium and lithium, preferably in the form of aqueous solutions, are admirably suited to this purpose. The hydroxides of barium, strontium, and calcium are not particularly recommended owing to peculiar side reactions that occur when these materials are utilized as sole catalyst. Strongly alkaline water-soluble compounds of the alkali metals, such as alkali metal zincate, plumbate, aluminate, etc. are excellent catalysts, although in most instances, in order to prevent premature gelling, it is advisable to mix such alkali metal compound with alkali metal hydroxide. The stronger organic amines, particularly polyamines of the type of ethylenediamine, diethylenetriamine, triethylenetetramine and tetraethylene pentamine are very suitable as catalysts, though they are not as potent as the alkali metal hydroxides and suffer from the disadvantage that, owing to their polyfunctional character, they have a tendency toward premature gelling. The organic ammonium bases such as tetraethanol ammonium hydroxide and benzyl trimethyl ammonium hydroxide, function as potent catalysts and have the advantage, for some applications, that after they have been heated during the process of cure they degenerate into milder alkaline materials.

It has been discovered that the water resistance of the ultimate cured products derived from the potentially reactive compositions of the present invention is substantially augmented if there be included in the composition an active hydroxide or oxide of a polyvalent metal, either as such or in the form of an alkali metal compound. Thus, materials such as copper oxide, copper hydroxide, ferrous hydroxide, ferric hydroxide, aluminum hydroxide, zinc hydroxide, etc., when added in relatively small amounts impart a high degree of water resistance to the ultimate cured composition. Among the preferred materials for the purpose of augmenting the water resistance are sodium zincate, sodium aluminate, sodium plumbate, etc. Sodium aluminate is colorless and readily available and is perhaps one of the most satisfactory materials for this purpose. Sodium aluminate, because of its strongly alkaline nature, also functions in the capacity of a catalyst. In the preferred procedure it is recommended to employ an aqueous sodium hydroxide solution of sodium aluminate.

The resinoids of the present invention are usually in a more or less fluid state. It is a peculiar fact that when an attempt is made to dehydrate the products of the present invention they invariably pass into a jell or semi-rubbery state, which circumstance precludes the procurement of these products in the soluble, fusible and grindably hard solid state. Compositions which contain a high percentage of phenol-aldehyde condensation products may be processed to the grindably hard solid state but, unfortunately, such compositions, owing to the low percentage of ketone-aldehyde condensation product which they contain, do not possess in any great measure the unique and distinctive attributes of the novel products of the present invention.

In the instance where the two condensation products to be mixed together are nominally more or less incompatible with one another two alternatives are open, viz. (1) one may effect solution through the use of a mutual coupling medium or solvent, or (2) one may produce a dispersion or emulsion in any one of several recognized methods.

The precise physical and chemical attributes possessed by any of the resinoids of the present invention are naturally dependent upon the nature of the condensation products mixed together or, going back further to the source, they are dependent upon the nature of the ketone, the phenol and the aldehyde that enter into the making of said condensation products. It has been observed that the unexpected distinctive attributes associated with the products of the present invention are manifested to a maximum degree (1) when acetone is in a component of the ketone-aldehyde condensation product; (2) when formaldehyde is a component of the ketone-aldehyde condensation product; (3) when phenol, metacresol, 3,5-xylenol or resorcinol is a component of the phenol-aldehyde condensation product; and (4) when formaldehyde or glyoxal is a component of the phenol-aldehyde condensation product. It appears that for most purposes the best results are procured when appropriately prepared acetone-formaldehyde condensation products are mixed with potentially reactive phenol-formaldehyde condensation products.

For reasons not fully understood it has been observed that products made out of the acetone-formaldehyde condensation products produced after the manner disclosed in U. S. Patent 2,191,802 appear to be superior to and different from those derived from acetone-formaldehyde condensation products produced merely via alkali catalysis without subsequent reaction in an acid environment.

For the purposes of the present invention the ratio of the phenol-aldehyde to the ketone-aldehyde condensation product may cover a wide range. I have found that in order that the compositions manifest to a substantial degree the unexpected, novel and highly desirable functional attributes with which the resinoids of the present invention are endowed it is necessary that the phenol-aldehyde condensation product (in terms of solids content on a weight basis) be present to the extent of not less than 5% upon the combined weights of the two condensation products. The unique and distinctive attributes associated with the products of the present invention are manifested in the largest degree when the phenol-aldehyde condensation product is present to the extent of between 10 and 30% upon the combined weights of the two condensation products. When the phenol-aldehyde condensation product is present to an extent in excess of 50% upon the combined weights of the two condensation products then the attributes of the ultimate product partake more and more of those associated with an ordinary modified phenol-aldehyde condensation product. When the concentration of the phenol-aldehyde condensation product exceeds 90% upon the combined weights of the two condensation products then the distinctive attributes manifested by the resinoids of the present invention are no longer readily discernible. The fact that the maximum showing of the distinctive attributes of the present products is manifested when the ketone-aldehyde condensation product is present to the extent of between 50 and 95% (best between 70 and 90%) upon the combined weights of the two condensation products indicates clearly that the ketone-aldehyde condensation product should comprise the major portion of the whole.

When the resinoids of the present invention are permitted to cure in the form of films or thin sections exposed to the atmosphere and subjected to a controlled time-temperature curing schedule the resultant products are dense, clear and homogeneous. When the resinoids of the present invention are subjected to curing conditions in thick cross sections, under circumstances where the opportunity for the escape of ready volatiles is small, or when cured in a closed space, then the results are quite different and depend upon a variety of factors. As the cure progresses the solvents or other inert fluids that may be present and which are not compatible with the ultimate cured products separate out as a distinct phase and tend to migrate away from the center, giving the effect of the resins shrinking toward the center and a substantial portion of the migratible fluid exuding out upon the surface (sweating out). Inasmuch as the products of the present invention generally contain a substantial quantity of inert fluids of one type or another this phenomenon is quite general. (As related elsewhere, there is a limit to the amount of dehydration to which the products of the present invention may be subjected without having them jell.) Under appropriate conditions of catalysis and a carefully controlled time-temperature schedule it is possible to so cure masses of the potentially reactive compositions of the present invention that they will yield hard, strong, dense, cured products, but the cured product will be in the form of small, more or less broken up, fragments, owing to the circumstances that as the cure progresses the shrinkage is so great that the resultant stresses and strains within the material cause the same to split and fracture. On the other hand, under appropriate conditions of catalysis and via the use of a very slow time-temperature schedule it is possible to cure the resinoids of the present invention so that the mass during the process of cure does not break up into small pieces. Under these conditions, however, the resultant product will be extremely microporous in character. For certain applications such microporosity is not objectionable and may indeed be a highly sought after attribute. In the light of these factors it is clear that the potentially reactive compositions of the present invention cannot be used as "casting resins" for the production of hard, dense, homogeneous articles.

The resinoids of the present invention may be variously modified so as to suit them to specific applications. I have already indicated how the water resistance of the ultimate cured compositions may be augmented through the incorporation of appropriate materials. For some purposes there is desired a product which, in the ultimate cured form, is possessed of a low resistance toward water, i. e., is water disintegratible. It has been discovered that such compositions are readily procured when there is added to the potentially reactive products a water-soluble material such as ethyleneglycol, diethyleneglycol, glycerine, triethanolamine, sugar, etc.

For some applications it may be desirable to extend the resinoids of the present invention. This can readily be accomplished through the addition of materials such as water-soluble compounds of lignin, (e. g., lignin-sulfonic acid which is produced on a large scale as a by-product in the manufacture of kraft paper). Up to 50% of such lignin-containing material may be added to the more water-soluble compositions of the present invention to yield ultimate cured articles of excellent strength.

In some applications, as when used as a plywood adhesive, the products of the present invention show an excessive tendency to penetrate into the softer woods. It has been found that the viscosity and penetrating qualities can readily be controlled through the incorporation of appropriate water-soluble or dispersible materials such as polyvinyl alcohol, hydroxyethylcellulose, sodium carboxymethylcellulose, saponin, etc., without otherwise interfering with the unique attributes of the products.

The resinoids of the present invention are admirably suited for use as impregnating agents for a wide variety of applications.

One of the phenomenal attributes of the compositions of the present invention resides in the extremely high coefficient of friction possessed by the fully cured products. The products are ideally suited for the manufacture of friction augments and for use as bonding agents in the production of friction elements.

The products of the present invention are preeminently suited for the manufacture of articles via the so-called cold molding technique.

The resinoids of the present invention are preeminently suited to the manufacture of thermosetting molding compounds, utilizing asbestos, wood flour, etc. as fillers. In this application it is necessary to dry out the mixture before subjecting the same to final cure under the influence of heat and pressure.

The products of the present invention, prior to the addition of a cure catalyst, are possessed of from fair to excellent keeping qualities. Depending upon the composition, the shelf life of the products of the present invention may range anywhere between three months and two years.

The potentially reactive compositions of the present application should not be confused with the products described in U. S. Patent 2,191,802. The resinoids of the present invention are chemically and physically distinct from the products that come into being when a phenol is reacted with a ketone-aldehyde condensation product (Example 1, column 2, page 5, U. S. Patent 2,191,802). The resinoids of the present invention are also distinct from compositions comprising phenol-aldehyde resins of the novolak type (which in order to permit of their cure require the use of a hardening agent) in admixture with a ketone-aldehyde condensation product. In such compositions the ketone-aldehyde condensation product (preferably a material such as "super active AFR," U. S. Patent 2,191,802) functions solely in the capacity of a "hardening" or "curing" agent. In contradistinction thereto the present invention depends upon the utilization of potentially reactive phenol-aldehyde condensation products which do not require the use of any "hardening" agent.

The resinoids of the present invention should not be confused with the products that come into being when mixtures comprising ketone-aldehyde condensation products, a phenol, an aldehyde and a catalyst are subjected to reaction. In such instances a variety of complex reactions take place concurrently, e. g., ketone-aldehyde condensation products react with phenol (e. g., see U. S. Patent 2,191,802); ketone-aldehyde condensation products enter into ready combination with aldehydes to yield acetals, while phenol reacts with aldehydes to yield condensation products. In the light of these factors it is not surprising to find that the resultant reaction products are profoundly different in kind from the potentially reactive compositions of the present invention.

The resinoids of the present invention should not be confused with the products that can be made by mixing or mixing and reacting together phenol-aldehyde condensates with ketone-aldehyde condensates selected from a class other than that indicated as suitable for use in the present invention. Thus, in the matter of their physical and chemical properties, compositions made with ketone-aldehyde condensation products such as 3-keto-butanol, 2-methyl-3-keto-butanol, hydracetylacetone, dimethylol-acetone, dimethylol-tetrahydro-4-pyrone, 2-methyl-3-keto-butyl alcohol, 2-aceto-2-methyl-trimethylene glycol, anhydro-enneaheptitol or heptahydric alcohol differ radically in kind from the novel and potentially reactive compositions of the present invention.

As many apparently widely different embodiments of this invention may be made without departing from the spirit thereof, it is to be understood that the invention is not limited to the specific illustrative examples contained in this specification, but rather that it encompasses the generalized procedures as broadly set forth, inasmuch as the details and modifications are rather self evident and amenable to orthodox chemical engineering practices.

Having thus described the invention, what is claimed as new and desired to be secured by Letters Patent is:

1. Resinoids comprising a mixture of a ketone-aldehyde and a potentially reactive phenol-aldehyde condensation product, said ketone-aldehyde condensation product being present to the extent of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting a ketone having the general formula $CH_3$—CO—R', wherein R' represents an unsubstituted aliphatic radical having from one to four carbon atoms, with an aldehyde having the general formula R''—CHO, wherein R'' represents a member selected from the group consisting of hydrogen and unsubstituted aliphatic radicals having from one to four carbon atoms.

2. Resinoids comprising a mixture of a ketone-aldehyde and a potentially reactive phenol-aldehyde condensation product, said ketone-aldehyde condensation product being present to the extent of between 50 and 95% on the combined weight of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting acetone with formaldehyde.

3. Resinoids comprising a mixture of a ketone-aldehyde and a potentially reactive phenol-formaldehyde condensation product, said ketone-aldehyde condensation product being present to the extent of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting a ketone having the general formula $CH_3$—CO—R', wherein R' represents an unsubstituted aliphatic radical having from one to four carbon atoms, with an aldehyde having the general formula R''—CHO, wherein R'' represents a member selected from the group consisting of hydrogen and unsubstituted aliphatic radicals having from one to four carbon atoms.

4. Resinoids comprising a mixture of a ketone-aldehyde and a potentially reactive phenol-formaldehyde condensation product, said ketone-aldehyde condensation product being present to the extent of between 50 and 95% on the combined weight of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting acetone with formaldehyde.

5. Resinoids comprising a mixture of a ketone-aldehyde and a potentially reactive phenol-aldehyde condensation product, said ketone-aldehyde condensation product being present to the extent of between 70 and 90% on the combined weights of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting a ketone having the general formula $CH_3$—CO—R', wherein R' represents an unsubstituted aliphatic radical having from one to four carbon atoms, with an aldehyde having the general formula R''—CHO, wherein R'' represents a member selected from the group consisting of hydrogen and unsubstituted aliphatic radicals having from one to four carbon atoms.

6. Resinoids comprising a mixture of a ketone-aldehyde and a potentially reactive phenol-aldehyde condensation product, said ketone-aldehyde condensation product being present to the extent of between 70 and 90% on the combined weight of said condensation products and selected from the class consisting of fusible, soluble, low molecular weight substantialy non-volatile condensation products capable of yielding distillable and crystallizable acetylation products capable of condensation in the presence of sodium hydroxide to yield, immediately or upon heating, a high molecular weight insoluble and infusible material and produced by reacting acetone with formaldehyde.

7. Resinoids comprising a mixture of a ketone-aldehyde and a potentially reactive phenol-formaldehyde condensation product, said ketone-aldehyde condensation product being present to the extent of between 70 and 90% on the combined weights of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and in fusible material and produced by reacting a ketone having the general formula $CH_3$—CO—R', wherein R' represents an unsubstituted aliphatic radical having from one to four carbon atoms, with an aldehyde having the general formula R''—CHO, wherein R'' represents a member selected from the group consisting of hydrogen and unsubstituted aliphatic radicals having from one to four carbon atoms.

8. Resinoids comprising a mixture of a ketone-aldehyde and a potentially reactive phenol-formaldehyde condensation product, said ketone-aldehyde condensation product being present to the extent of between 70 and 90% on the combined weight of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting acetone with formaldehyde.

9. Cured products of resinoids comprising a mixture of a ketone-aldehyde and a potentially reactive phenol-aldehyde condensation product, said ketone-aldehyde condensation product being present to the extent of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting a ketone having the general formula $CH_3$—CO—R', wherein R' represents an unsubstituted aliphatic radical having from one to four carbon atoms, with an aldehyde having the general formula R''—CHO, wherein R'' represents a member selected from the group consisting of hydrogen and unsubstituted aliphatic radicals having from one to four carbon atoms.

10. Cured products of resinoids comprising a mixture of a ketone-aldehyde and a potentially reactive phenol-aldehyde condensation product, said ketone-aldehyde condensation product being present to the extent of between 50 and 95% on the combined weight of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting acetone with formaldehyde.

11. Cured products of resinoids comprising a mixture of a ketone-aldehyde and a potentially reactive phenol - formaldehyde condensation product, said ketone - aldehyde condensation product being present to the extent of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting a ketone having the general formula $CH_3$—CO—R', wherein R' represents an unsubstituted aliphatic radical having from one to four carbon atoms, with an aldehyde having the general formula R''—CHO, wherein R'' represents a member selected from the group consisting of hydrogen and unsubstituted aliphatic radicals having from one to four carbon atoms.

12. Cured products of resinoids comprising a mixture of a ketone-aldehyde and a potentially reactive phenol - formaldehyde condensation product, said ketone - aldehyde condensation product being present to the extent of between 50 and 95% on the combined weight of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting acetone with formaldehyde.

13. Cured products of resinoids comprising a mixture of a ketone-aldehyde and a potentially reactive phenol-aldehyde condensation product, said ketone-aldehyde condensation product being present to the extent of between 70 and 90% on the combined weights of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting a ketone having the general formula $CH_3$—CO—R', wherein R' represents an unsubstituted aliphatic radical having from one to four carbon atoms, with an aldehyde having the general formula R''—CHO, wherein R'' represents a member selected from the group consisting of hydrogen and unsubstituted aliphatic radicals having from one to four carbon atoms.

14. Cured products of resinoids comprising a mixture of a ketone-aldehyde and a potentially reactive phenol-aldehyde condensation product, said ketone-aldehyde condensation product being present to the extent of between 70 and 90% on the combined weight of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting acetone with formaldehyde.

15. Cured products of resinoids comprising a mixture of a ketone-aldehyde and a potentially reactive phenol-formaldehyde condensation product, said ketone-aldehyde condensation product being present to the extent of between 70 and 90% on the combined weights of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting a ketone having the general formula $CH_3$—CO—R', wherein R' represents an unsubstituted aliphatic radical having from one to four carbon atoms, with an aldehyde having the general formula R''—CHO, wherein R'' represents a member selected from the group consisting of hydrogen and unsubstituted aliphatic radicals having from one to four carbon atoms.

16. Cured products of resinoids comprising a mixture of a ketone-aldehyde and a potentially reactive phenol - formaldehyde condensation product, said ketone - aldehyde condensation product being present to the extent of between 70 and 90% on the combined weight of said condensation products and selected from the class consisting of fusible, soluble, low molecular weight substantially non-volatile condensation products capable of yielding distillable and crystallizable acetylation products capable of condensation in the presence of sodium hydroxide to yield, immediately or upon heating, a high molecular weight insoluble and infusible material and produced by reacting acetone with formaldehyde.

GEORGE KARL VOGELSANG.

REFERENCES CITED

The following references are of record in the file of this patent:

UNITED STATES PATENTS

| Number | Name | Date |
| --- | --- | --- |
| 1,514,508 | Ellis | Nov. 4, 1924 |
| 2,191,802 | Novotny et al. | Feb. 27, 1940 |
| 2,206,906 | Loos | July 9, 1940 |
| 2,426,128 | Trowell | Aug. 19, 1947 |
| 2,545,559 | Schrimpe | Mar. 20, 1951 |

OTHER REFERENCES

Kropa, "Thermosetting Vinyl Polymers," Transactions of the Electrochemical Society, pp. 247, 252–257, vol. 90 (1947).